United States Patent
Chen et al.

(10) Patent No.: US 11,871,259 B2
(45) Date of Patent: Jan. 9, 2024

(54) SOUNDING REFERENCE SIGNAL (SRS) GUIDED DOWNLINK CHANNEL STATE INFORMATION-REFERENCE SIGNAL (CSI-RS) SCAN

(71) Applicant: QUALCOMM Incorporated, San Diego, CA (US)

(72) Inventors: Bo Chen, Beijing (CN); Pavan Kumar Vitthaladevuni, San Diego, CA (US); Yu Zhang, Beijing (CN); Ruifeng Ma, Beijing (CN); Joseph Binamira Soriaga, San Diego, CA (US); Yeliz Tokgoz, San Diego, CA (US); Tingfang Ji, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/275,128

(22) PCT Filed: Sep. 26, 2019

(86) PCT No.: PCT/CN2019/108090
§ 371 (c)(1),
(2) Date: Mar. 10, 2021

(87) PCT Pub. No.: WO2020/063729
PCT Pub. Date: Apr. 2, 2020

(65) Prior Publication Data
US 2022/0078649 A1 Mar. 10, 2022

Related U.S. Application Data

(63) Continuation of application No. PCT/CN2018/108110, filed on Sep. 27, 2018.

(30) Foreign Application Priority Data

Sep. 27, 2018 (WO) ................ PCT/CN2018/108110

(51) Int. Cl.
*H04W 24/10* (2009.01)
*H04L 5/00* (2006.01)
*H04L 25/02* (2006.01)

(52) U.S. Cl.
CPC ........... *H04W 24/10* (2013.01); *H04L 5/0057* (2013.01); *H04L 25/0224* (2013.01)

(58) Field of Classification Search
CPC ... H04W 24/10; H04L 5/0057; H04L 25/0224
(Continued)

(56) References Cited

U.S. PATENT DOCUMENTS 9,559,820 B2 1/2017 Geirhofer et al.
10,542,544 B2 * 1/2020 Zhang ...................... H04B 7/04
(Continued)

FOREIGN PATENT DOCUMENTS

CN 103220704 A 7/2013
CN 104584625 A 4/2015
(Continued)

OTHER PUBLICATIONS

Huawei, et al., "Discussion on Reciprocity Based CSI Acquisition Mechanism", 3GPP TSG RAN WG1 NR Ad Hoc Meeting, R1-1711404, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017 Jun. 26, 2017, XP051300592, 4 Pages.
(Continued)

*Primary Examiner* — Christopher R Crompton
(74) *Attorney, Agent, or Firm* — QUALCOMM Incorporated

(57) ABSTRACT

Certain aspects of the present disclosure generally relate to methods and apparatus for sounding reference signal (SRS)
(Continued)

guided downlink channel state information-reference signal (CSI-RS) scan. One example method for wireless communication generally includes determining whether to perform channel measurement and reporting operations for a user-equipment (UE) using a reciprocity-based scheme or a channel state information-reference signal (CSI-RS) based scheme based on a criteria of a cell, and performing the channel measurement and reporting operations based on the determination.

28 Claims, 14 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2015/0063177 A1* | 3/2015 | Kim | H04L 5/0048 370/280 |
| 2015/0256239 A1 | 9/2015 | Yu et al. | |
| 2017/0311321 A1 | 10/2017 | Kakishima et al. | |
| 2018/0091207 A1 | 3/2018 | Kakishima et al. | |
| 2018/0115355 A1 | 4/2018 | Nagata et al. | |
| 2019/0123864 A1* | 4/2019 | Zhang | H04B 7/088 |

FOREIGN PATENT DOCUMENTS

| | | | |
|---|---|---|---|
| CN | 106301490 A | 1/2017 | |
| EP | 2945417 | * 11/2015 | ............ H04W 48/20 |
| WO | 2012112281 | 8/2012 | |

OTHER PUBLICATIONS

Supplementary European Search Report—EP19864769—Search Authority—Munich—Jun. 8, 2022.
International Search Report and Written Opinion—PCT/CN2018/108110—ISA/EPO—dated Jun. 28, 2019.
International Search Report and Written Opinion—PCT/CN2019/108090—ISA/EPO—dated Dec. 27, 2019.
ZTE, et al., "Beam Selection and CSI Acquisition for NR MIMO," 3GPP TSG RAN WG1 Meeting #86bis, R1-1608671, Oct. 14, 2016 (Oct. 14, 2016), 8 Pages.

* cited by examiner

SOUNDING REFERENCE SIGNAL (SRS) GUIDED DOWNLINK CHANNEL STATE INFORMATION-REFERENCE SIGNAL (CSI-RS) SCAN

CROSS REFERENCE TO RELATED APPLICATIONS

This application is a national stage application under 35 U.S.C. 371 of PCT/CN2019/108090, filed Sep. 26, 2019, which claims priority to PCT Application No. PCT/CN2018/108110, filed Sep. 27, 2018, which are assigned to the assignee hereof and hereby expressly incorporated by reference herein in their entireties as if fully set forth below and for all applicable purposes.

INTRODUCTION

Aspects of the present disclosure relate to wireless communication, and more particularly, to communication of techniques for performing channel estimation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or L network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for sounding reference signal (SRS) guided downlink channel state information-reference signal (CSI-RS) scan.

Certain aspects of the present disclosure provide a method for wireless communication. The method generally includes determining whether to perform channel measurement and reporting operations for a user-equipment (UE) using a reciprocity-based scheme or a channel state information-reference signal (CSI-RS) based scheme based on a criteria of a cell, and performing the channel measurement and reporting operations based on the determination.

Certain aspects of the present disclosure provide a method for wireless communication. The method generally includes receiving sounding reference signals (SRSs) from a UE, selecting multiple sets of beams based on the SRSs received from the UE, transmitting first channel state information-reference signals (CSI-RSs) to the UE via the multiple sets of beams, receiving first channel measurement feedback information from the UE indicating a set of beams of the multiple sets of beams received at the UE with the best quality, transmitting a second CSI-RS based on the feedback from the UE, receiving second channel measurement feedback information from the UE based on the second CSI-RS, and communicating data with the UE based on the second channel measurement feedback information.

Certain aspects of the present disclosure provide a method for wireless communication. The method generally includes transmitting sounding reference signals (SRSs) to a base station, receiving first channel state information-reference signals (CSI-RSs) from the base station via multiple sets of beams, selecting a set of beams of the multiple sets of beams corresponding to one of the first CSI-RSs received at a UE with the best quality, transmitting first channel measurement feedback information indicating the set of beams of the multiple sets of beams, receiving a second CSI-RS from the base station based on the first channel measurement feedback information, transmitting second channel measurement feedback information to the UE based on the second CSI-RS, and communicating data based on the second channel measurement feedback information.

Aspects generally include methods, apparatus, systems, computer program products, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
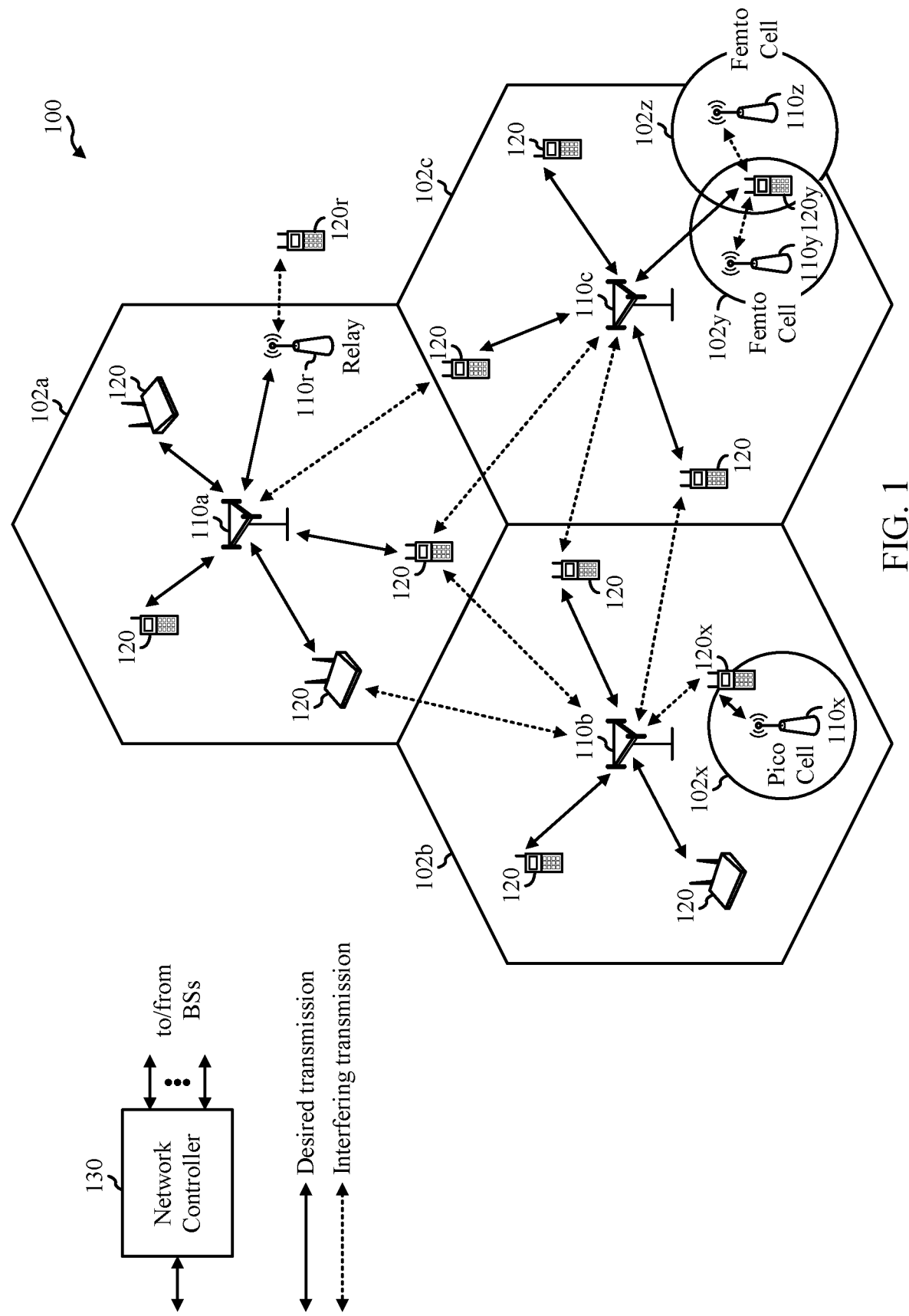
FIG. 1 is a block diagram conceptually illustrating an example telecommunications system, in accordance with certain aspects of the present disclosure.

Aspects of the present disclosure provide apparatus, methods, processing systems, and computer readable mediums for sounding reference signal (SRS) guided downlink channel state information-reference signal (CSI-RS) scan.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in Conjunction with the 5G Technology Forum (5GTF). 3GPP Long Term Evolution (LTE) and LTE-Advanced (LTE-A) are releases of UNITS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc.

Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
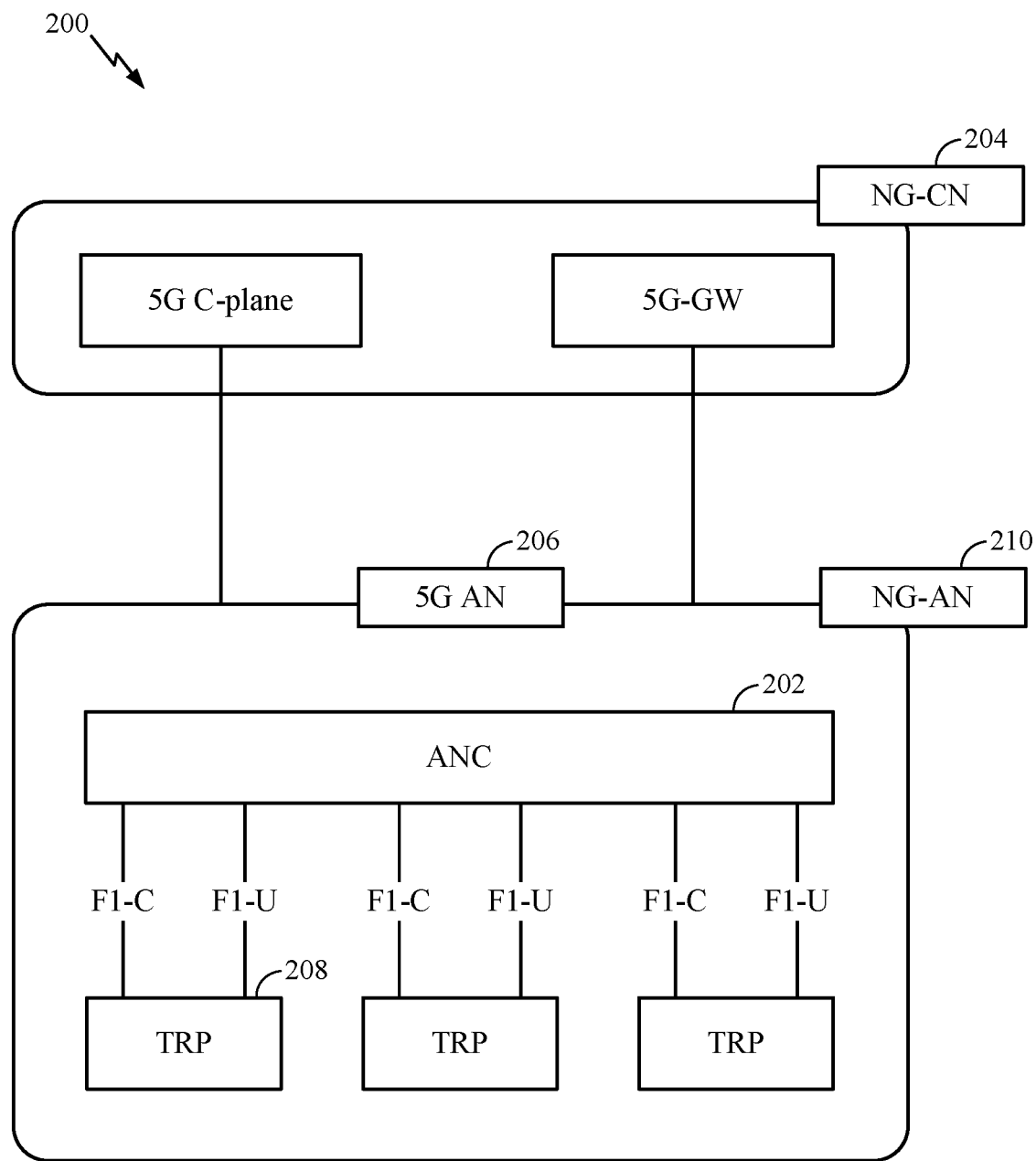
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
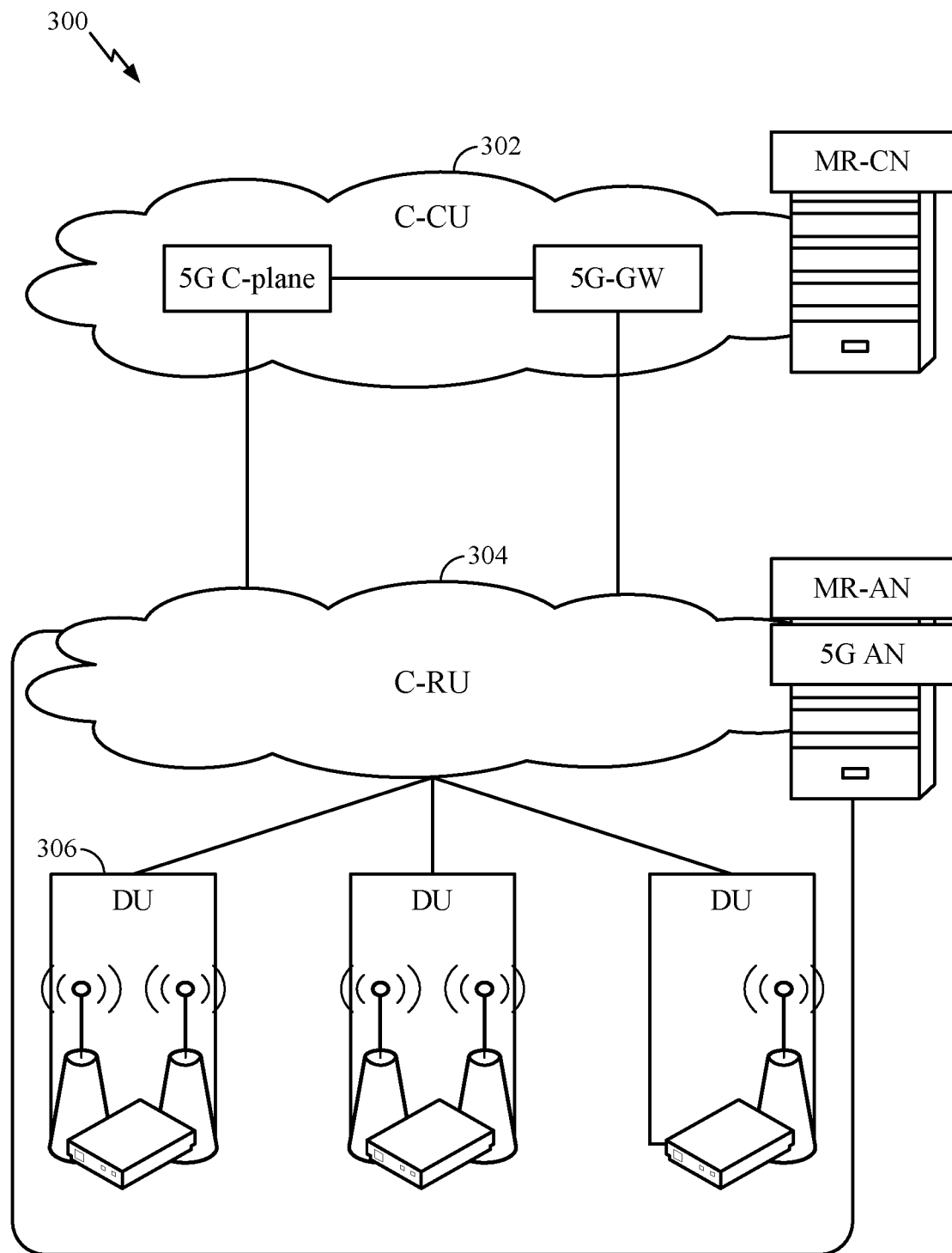
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
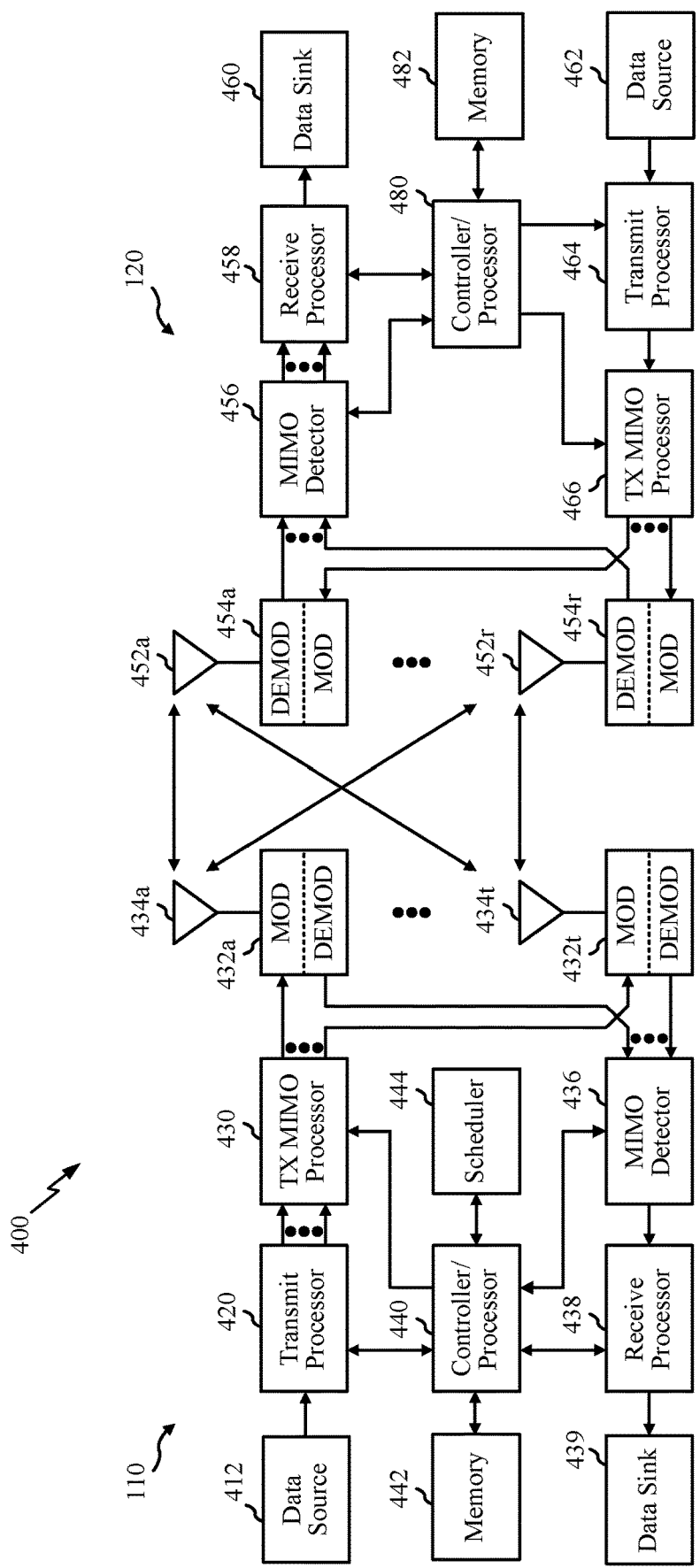
FIG. 4 is a block diagram conceptually illustrating a design of an example base station (BS) and user equipment (UE), in accordance with certain aspects of the present disclosure.

FIG. 4 illustrates example components 400 of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
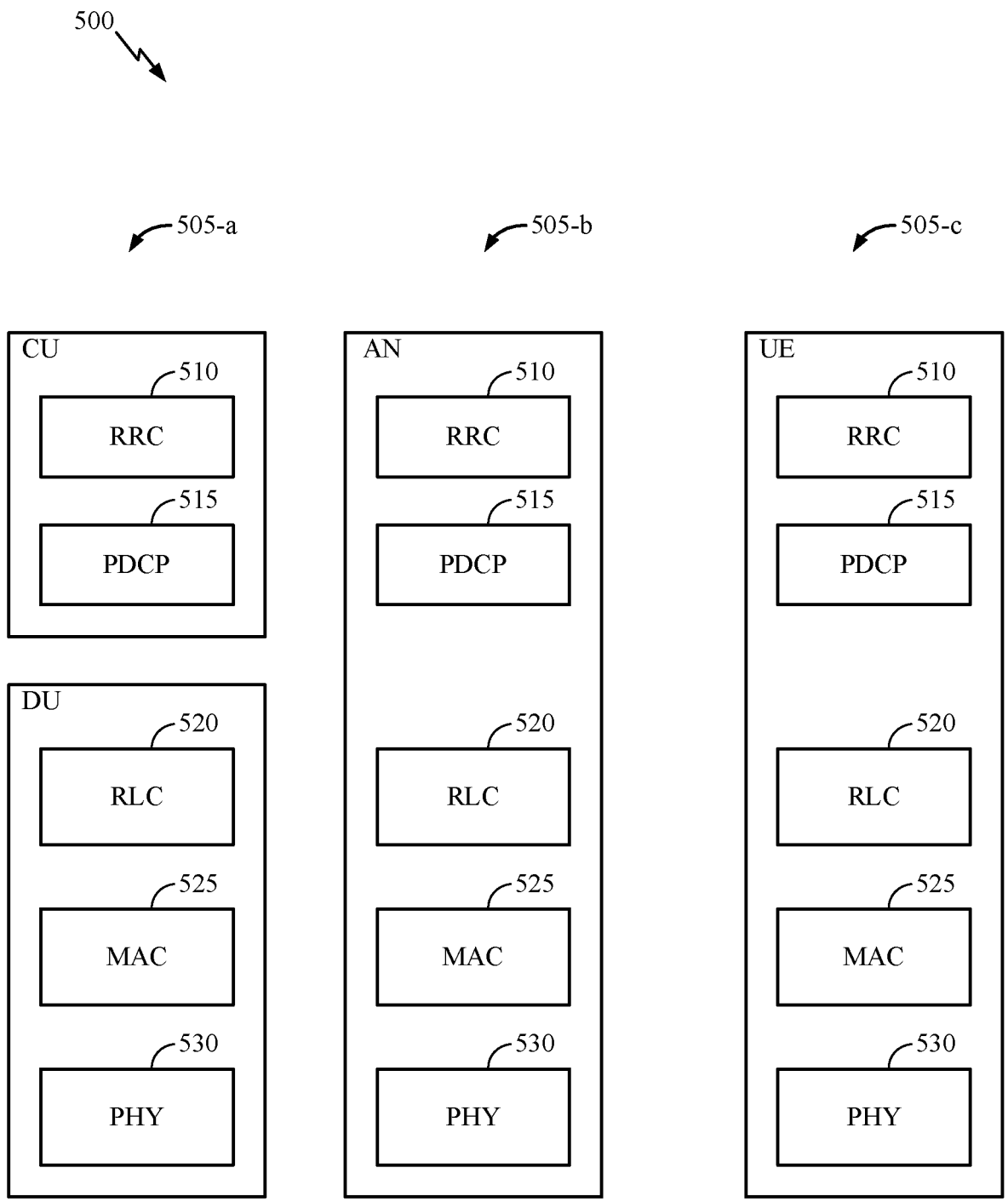
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
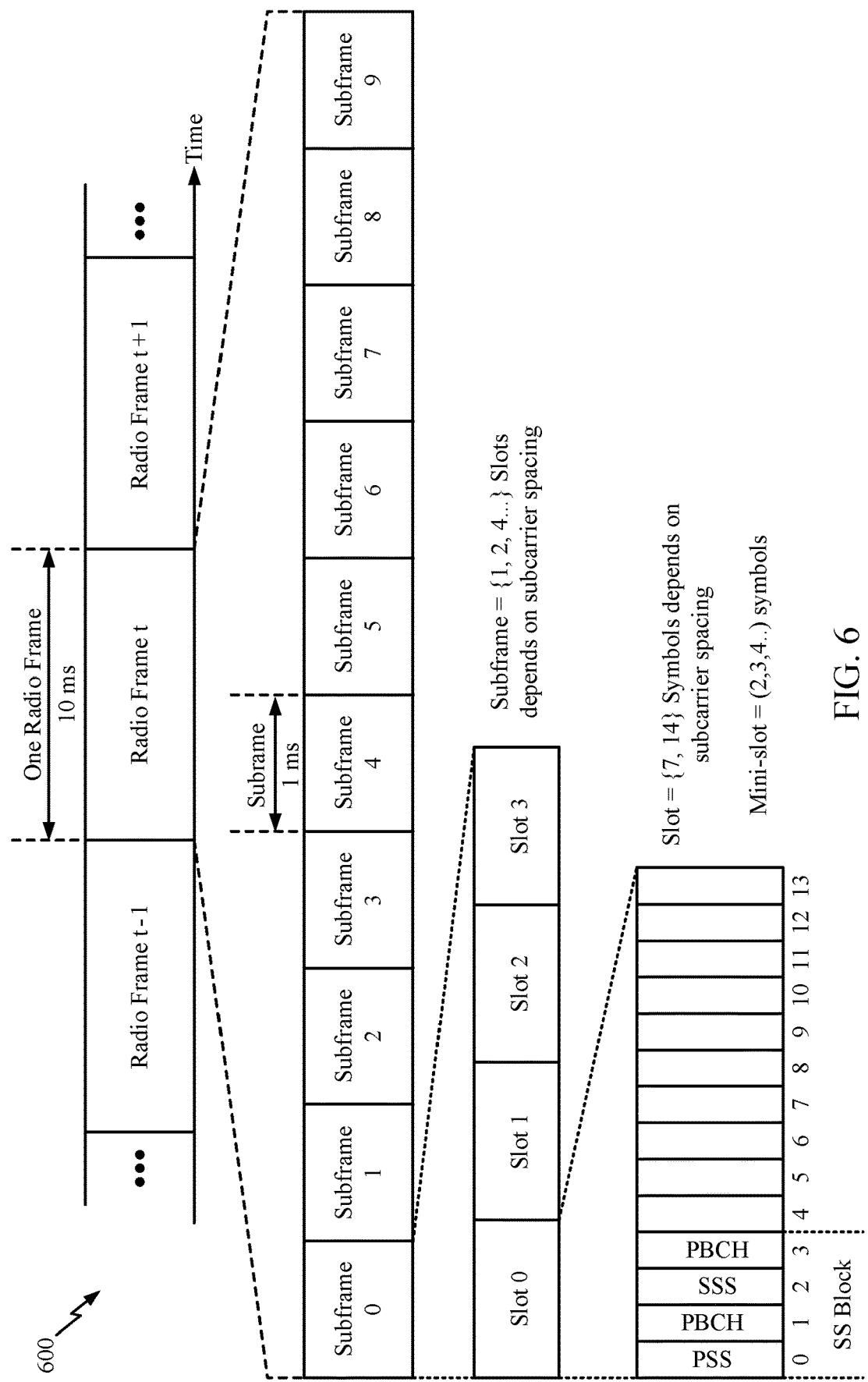
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 7:
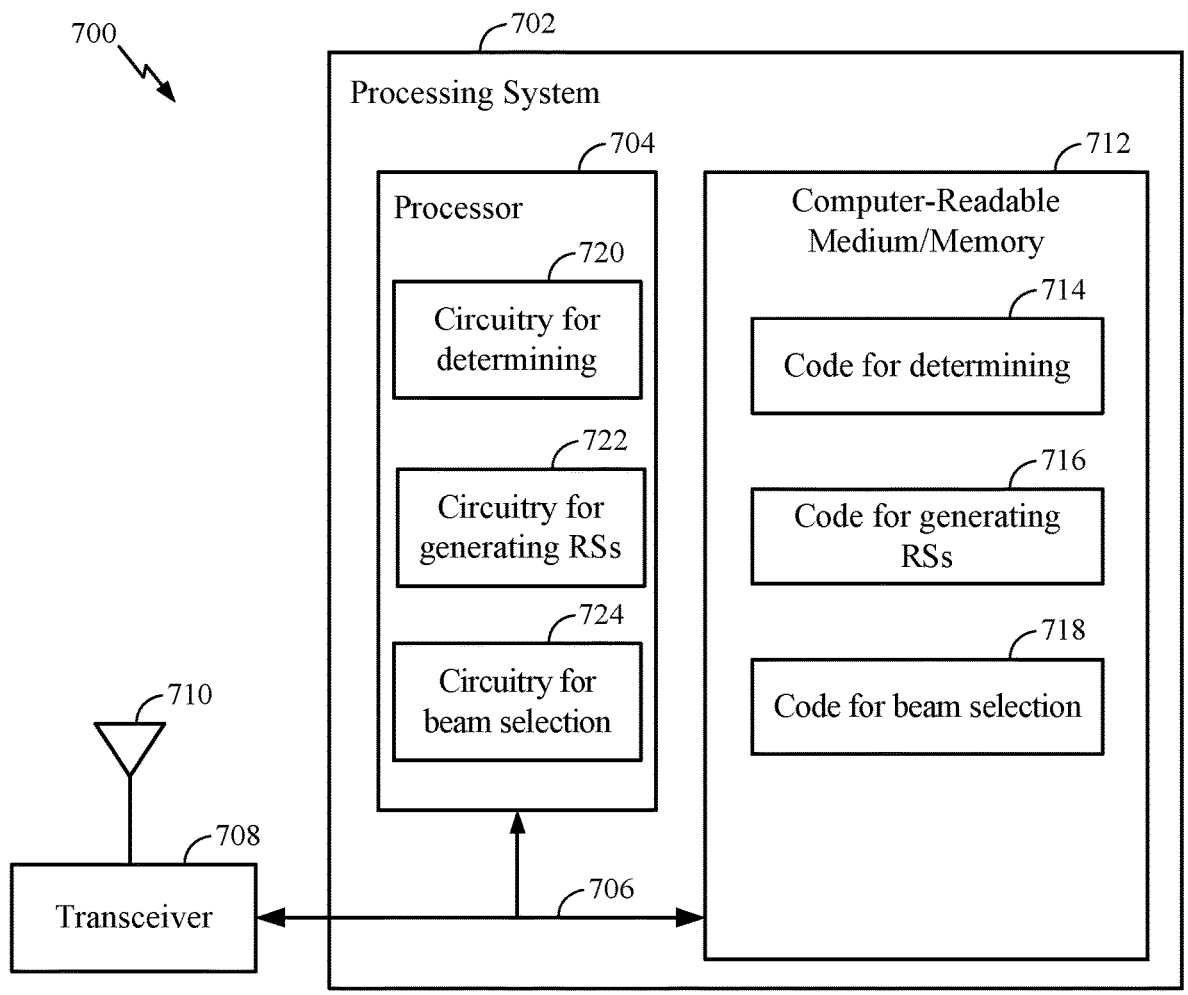
FIG. 7 illustrates a communications device that may include various components configured to perform operations for the techniques disclosed herein in accordance with aspects of the present disclosure.
Figure 8:
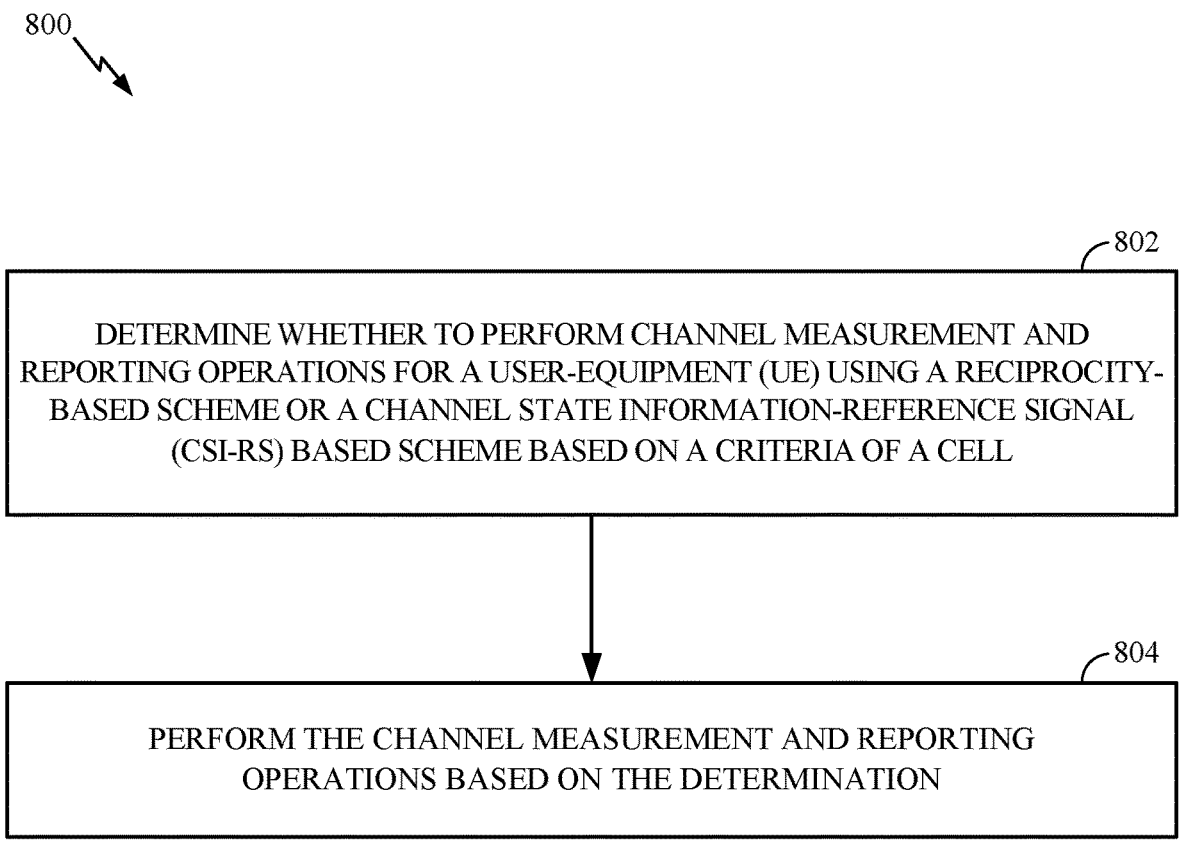
FIG. 8 is a flow diagram illustrating example operations for wireless communication, in accordance with certain aspects of the present disclosure.
Figure 9:
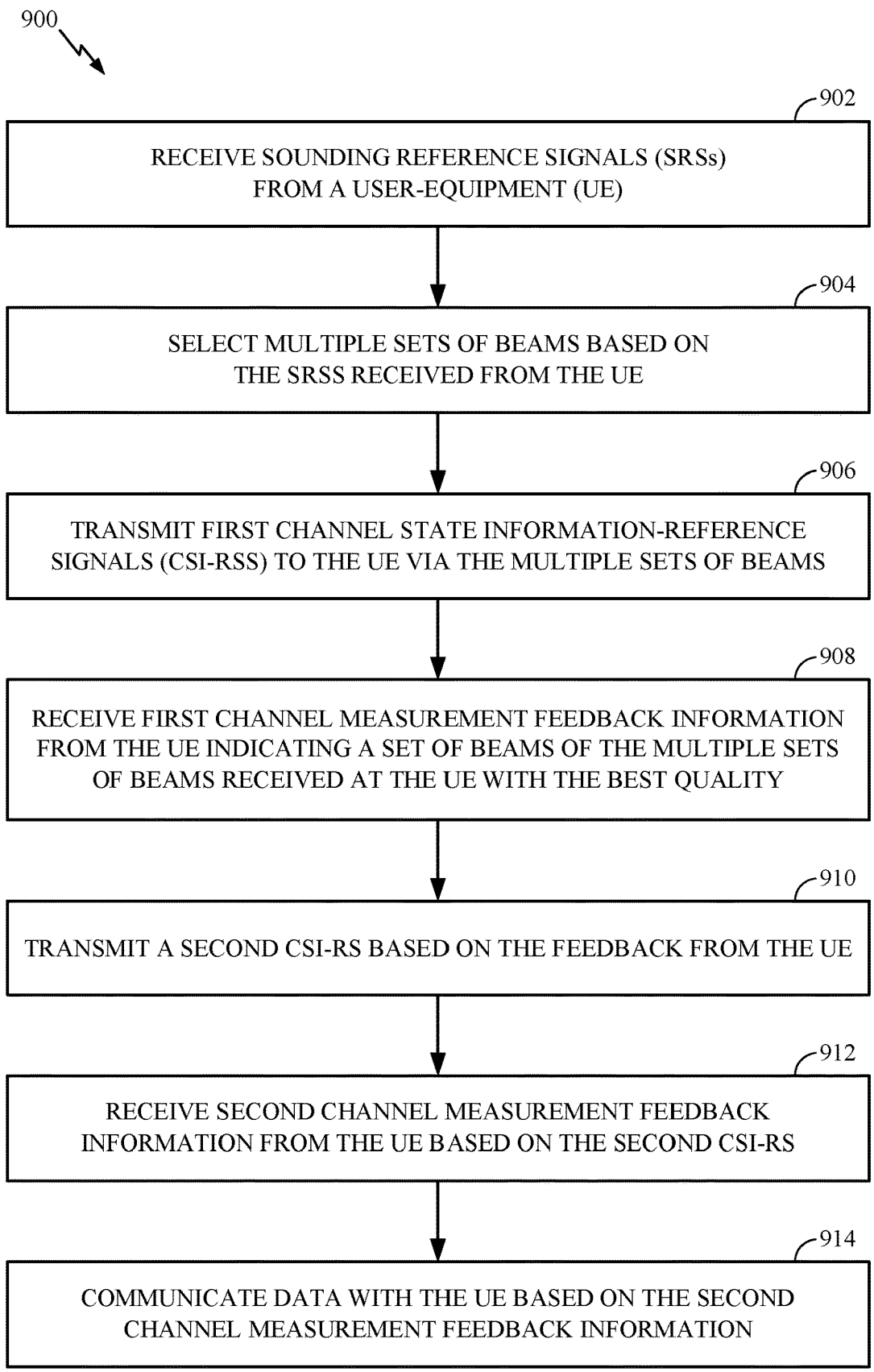
FIG. 9 is a flow diagram illustrating example operations for wireless communication, in accordance with certain aspects of the present disclosure.
Figure 10:
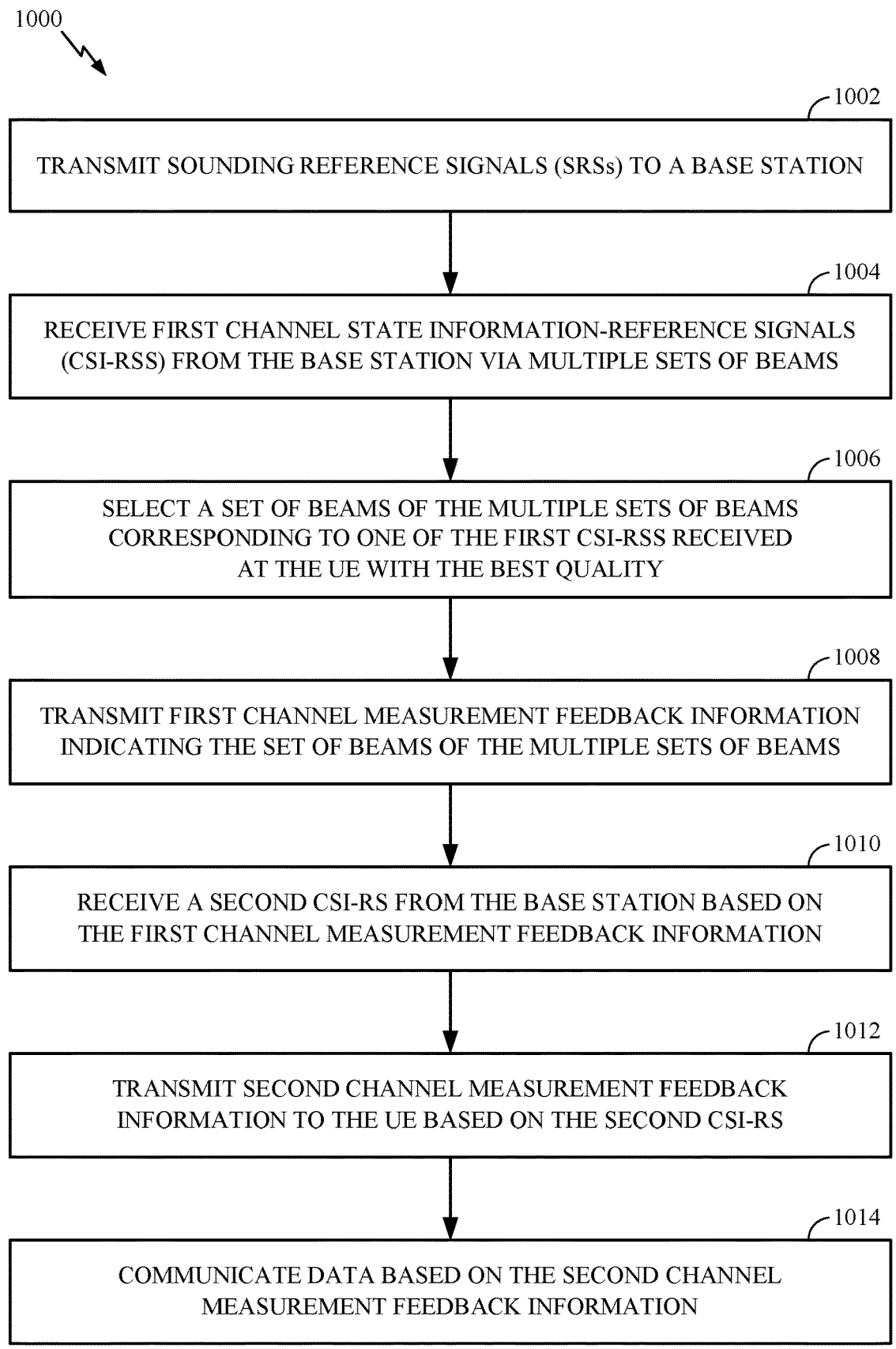
FIG. 10 is a flow diagram illustrating example operations for wireless communication, in accordance with certain aspects of the present disclosure.

FIG. 7 illustrates a communications device 700 that may include various components (e.g., corresponding to means-plus-function components) configured to perform operations for the techniques disclosed herein, such as the operations illustrated in FIGS. 8-10. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer executable code) that when executed by the processor 704, cause the processor 704 to perform the operations illustrated in FIGS. 8-10, or other operations for performing the various techniques discussed herein. In certain aspects, computer-readable medium/memory 712 stores code for determining 714, code for generating reference signals 716 (e.g., generating sounding reference signals SRSs or channel state information-reference signals (CSI-RS)), and code for beam selection 718. In certain aspects, the processor 704 has circuitry configured to implement the code stored in the computer-readable medium/memory 712. The processor 704 may include circuitry for determining 720, circuitry for generating reference signals 722 (e.g., generating sounding reference signals SRSs or channel state information-reference signals (CSI-RS)), and circuitry for beam selection 724.

Example Techniques for Sounding Reference Signal (SRS) Guided Downlink Channel State Information-Reference Signal (CSI-RS) Scan A sounding reference signal (SRS) is a reference signal transmitted by a UE in the uplink direction. The SRS may be used by the base station 110 (e.g., gNB or eNB) to estimate the uplink channel quality. For example, as illustrated in FIG. 1, a UE 120 may transmit SRS to an eNB 110. The eNB 110 may use the SRS to schedule uplink frequency resources for the UE.

Channel estimation information may be obtained through a reciprocity-based scheme. For example, in time-division duplexing (TDD) systems, uplink and downlink transmissions take place over the same frequency band. Hence, if transmissions are performed within a time during which there is channel coherence, the uplink and downlink channel states may be considered to be similar. As a result, the downlink channel to each user ideally may be estimated in the uplink direction through the transmission of SRS from the user equipment (UE), and may be used in the design of downlink beams. The SRS may be used to measure the uplink channel quality over a portion of the uplink channel bandwidth.

Channel state information (CSI) may refer to known channel properties of a communication link. The CSI may represent the combined effects of, for example, scattering, fading, and power decay with distance between a transmitter and a receiver. Channel estimation using the pilot signals, such as CSI reference signals (CSI-RS), may be performed to determine these effects on the channel. CSI may be used to adapt transmissions based on current channel conditions, which may be useful for achieving reliable communication, in particular, with high data rates in multi-antenna systems. CSI is typically estimated at the receiver, quantized, and fed back to the transmitter.

A network (e.g., a base station 110), may configure UEs for CSI reporting. For example, the BS 110 may configure the UE 120 with a CSI report configuration (sometimes referred to as a 'CSI report setting') or with multiple CSI report configurations. The CSI report configuration may be provided to the UE via higher layer signaling, such as radio resource control (RRC) signaling. The CSI report configurations may be associated with CSI-RS resources used for channel measurement (CM), interference measurement (IM), or both. The CSI report configuration configures CSI-RS resources (sometimes referred to as the 'CSI-RS resource setting') for measurement. The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration may also configure the CSI parameters (sometimes referred to as quantities) to be reported using codebooks. Three example types of codebooks include Type I single panel, Type I multi-panel, and Type II single panel. Regardless of which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. For the Type I single panel codebook, the PMI may include a W1 matrix (e.g., subset of beams) and a W2 matrix (e.g., phase for cross polarization combination and beam selection). For the Type I multi-panel codebook, compared to type I single panel codebook, the PMI may also include a phase for cross panel combination. For the Type II single panel codebook, the PMI may be a linear combination of beams and have a subset of orthogonal beams to be used for linear combination. The PMI for the Type II single panel codebook may have per layer and per polarization, amplitude and phase for each beam. For the PMI of any type, there may be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select one or more preferred CSI-RS resources or select a CSI-RS resource comprising one or more port groups. The UE may report the CSI feedback for each of the CSI-RS resources and/or port groups.

A reciprocity-based scheme for performing channel estimation provides better performance for cell median/center UEs than a downlink CSI-RS-based scheme due to codebook quantization loss in downlink CSI-RS based scheme, especially in context of massive multiple-input multiple-out (MIMO) communication. However, a reciprocity-based scheme may degrade performance for cell-edge UEs as compared to downlink CSI-RS-based scheme due to uplink limited transmit power leading to poor SRS channel estimation performance for cell edge UEs.

Certain aspects of the present disclosure are directed to an SRS-guided downlink CSI-RS scan that improves performance of cell-edge UEs in a reciprocity-based system. For example, certain aspects provide a hybrid use of both reciprocity-based scheme and a downlink CSI-RS-based scheme. The downlink CSI-RS-based scheme may be used for cell edge UEs and a reciprocity-based scheme may be used for cell median/center UEs. In other words, depending on a criteria of the cell, such as the channel quality between the base station and the UE, either the reciprocity-based scheme or the CRI-RS based scheme may be used. A base station may select whether the downlink CSI-RS-based scheme or reciprocity-based scheme is applicable for a specific UE, and use the selected scheme to perform channel estimation for the UE. In some cases, the UE may select whether the downlink CSI-RS-based scheme or reciprocity-based scheme is be used, and send an indication to the base station accordingly.

For cell edge UEs (e.g., corresponding to lower channel quality), the BS 110 may transmit multiple sets of UE-specific beamformed CSI-RS signals to a target UE, where the beams for CSI-RS transmission are based on UE SRS signals. The UE then measures each set of UE specific beamformed CSI-RS signals and provides feedback regarding the best beamformed CSI-RS signal to the base station. The base station then transmits a pre-scheduled CSI-RS with the corresponding beams, which are derived in accordance with the feedback from the UE, to achieve CQI feedback and a corresponding multi-user (MU) precoder for data transmission.

FIG. 8 is a flow diagram illustrating example operations 800 for wireless communication, in accordance with certain aspects of the present disclosure. The operations 800 may be performed by a base station, such as the base station 110, or a UE such as the UE 120.

The operations 800, begin at block 802, by determining whether to perform channel measurement and reporting operations for a user-equipment (UE) using a reciprocity-based scheme or a channel state information-reference signal (CSI-RS) based scheme based on a criteria of a cell. For example, the criteria may correspond to an indication of signal quality of an uplink (UL) signal from the UE or an indication of UE capability from the UE. The indication of the signal quality of the UL signal from the UE may include a sounding reference signal (SRS) signal quality, physical downlink shared channel (PDSCH) acknowledgement/negative acknowledgement (ACK/NACK), and/or a physical uplink shared channel (PUSCH) decoding performance. In certain aspects, the indication of the UE capability may include an indication that a number of transmit antennas of the UE is equal to a number of receive antennas of the UE, or an indication that the number of transmit antennas of the UE is less than the number of receive antennas of the UE In certain aspects, the base station 110 may receive a flag in an UL channel from the UE 120 indicating one of the reciprocity-based scheme, the CSI-RS based scheme, and a combination of the both the reciprocity-based scheme and the CSI-RS based scheme to be used for channel estimation operations. For example, the flag may be determined by the UE 120 based on a signal quality of a downlink (DL) signal. In certain aspects, the criteria may include a physical downlink shared channel (PDSCH) decode performance, a physical downlink control channel (PDCCH) decode performance, and/or DL CSI-RS received signal quality. The channel measurement and reporting operations, for the combination of the reciprocity-based scheme and the CSI-RS based scheme, may include the UE 120 transmitting an SRS signal and measuring CSI-RS signals. The UE may then feedback CSI based on the measurement of the CSI-RS signals. The BS 110 may then combine the feedback from the UE and the SRS from the UE to generate PDSCH precoder information.

In other words, the determination, at block 802, of whether to perform channel measurement and reporting operation using the reciprocity-based scheme or the CSI-RS based scheme comprises determining to use a combination of the reciprocity-based scheme and the CSI-RS based scheme. In this case, the channel measurement and report operations may include receiving SRSs from the UE, transmitting CSI-RSs to the UE via multiple sets of beams, receiving feedback from the UE indicating a set of beams of the multiple sets of beams received at the UE with the best quality, determining precoding information based on the SRSs and the feedback from the UE, and communicating data with the UE based on the precoding information.

In certain aspects, the operations 800 also include, at block 804, performing the channel measurement and reporting operations based on the determination described with respect to block 802. The channel measurement and reporting operations corresponding to the CSI-RS based scheme are described in more detail with respect to FIG. 9.

FIG. 9 is a flow diagram illustrating example operations 900 for wireless communication, in accordance with certain aspects of the present disclosure. The operations 900 may be performed by a base station 110.

The operations 900, begin at block 902, by receiving SRSs from a UE, and at block 904, selecting multiple sets of beams based on the SRSs received from the UE. At block 906, first channel state information-reference signals (CSI-RSs) may be transmitted to the UE via the multiple sets of beams. In certain aspects, at block 908, the base station 110 may also receive first channel measurement feedback information from the UE indicating a set of beams of the multiple sets of beams received at the UE with the best quality, and at block 910, transmit a second CSI-RS based on the first channel measurement feedback information from the UE. In certain aspects, the operations 900 may also include, at block 912, receiving second channel measurement feedback information from the UE based on the second CSI-RS, and at block 914, communicating data with the UE based on the second channel measurement feedback information.

FIG. 10 is a flow diagram illustrating example operations 1000 for wireless communication, in accordance with certain aspects of the present disclosure. The operations 1000 may be performed by a UE, such as the UE 120. The operations 1000 correspond to the operations 900 described with respect to FIG. 9, but from the perspective of the UE 120.

The operations 1000, begin at block 1002, by transmitting SRSs to a base station, and at block 1004, by receiving first channel state information-reference signals (CSI-RSs) from the base station via multiple sets of beams. At block 1006, the UE selects a set of beams of the multiple sets of beams corresponding to one of the first CSI-RSs received at the UE with the best quality. In certain aspects, at block 1008, the UE 120 may also transmit first channel measurement feedback information indicating the set of beams of the multiple sets of beams, and at block 1010, receive a second CSI-RS from the base station based on the feedback. In certain aspects, the operations 1000 may also include, at block 1012, transmitting second channel measurement feedback information to the UE based on the second CSI-RS, and at block 1014, communicating data based on the second channel measurement feedback information. The channel measurement and reporting operations corresponding to the CSI-RS schemes, described with respect to FIGS. 9 and 10, are described in more detail with respect to FIG. 11.

Figure 11:
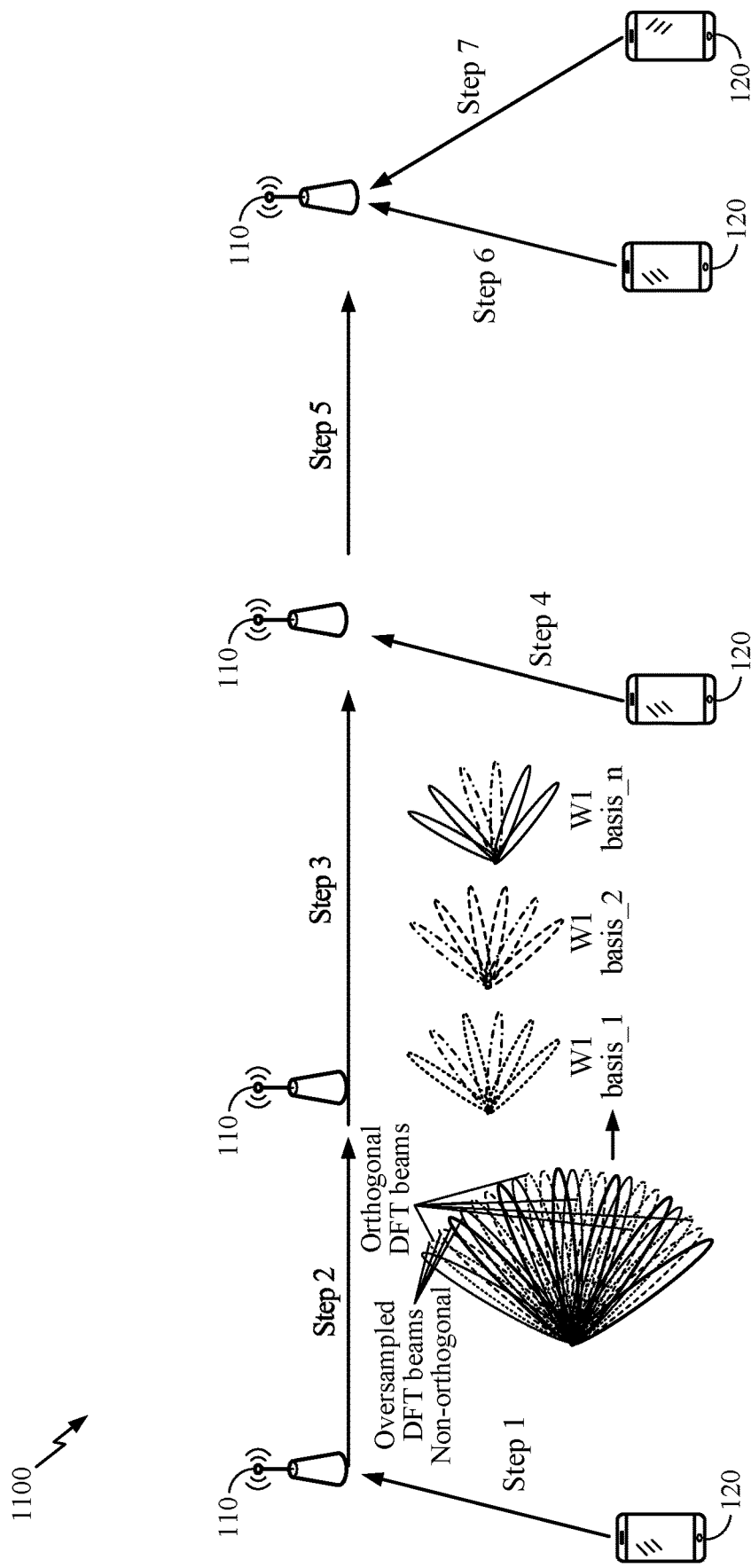
FIG. 11 illustrates example operations for a sounding reference signal (SRS) guided downlink channel state information-reference signal (CSI-RS) scan, in accordance with certain aspects of the present disclosure.

FIG. 11 illustrates example operations 1100 for an SRS guided downlink CSI-RS scan, in accordance with certain aspects of the present disclosure. As illustrated, in step 1 (e.g., corresponding to block 902 of FIG. 9 and block 1002 of FIG. 10), the UE 120 transmits SRSs to the base station 110.

At step 2 (e.g., corresponding to block 904 of FIG. 9), the base station 110 selects downlink orthogonal beams (W1 basis) based on the SRSs received from the UE. In other words, the base station 110 selects multiple sets of beams based on the SRSs, referred to as W1 basis_1 to W1 basis n. In certain aspects, the total number (n) of W1 basis may be equal to O1×O2, and each W1 basis may contain N1*N2 orthogonal beams. N1 and N2 represent first and second quantities of antenna ports indicating respective quantities of antenna ports in first and second dimensions of an antenna array, and O1 and O2 represent first and second oversampling factors indicating respective oversampling factors for DFT beams in the first and second dimensions.

At step 3 (e.g., corresponding to block 906 of FIG. 9), the base station 110 transmits CSI-RSs across the selected beams. For example, the base station 110 transmits a multiple W1 basis (e.g., W1 basis_1 to W1 basis n), as illustrated.

At step 4 (e.g., corresponding to block 908 of FIG. 9 and blocks 1006, 1008 of FIG. 10), the UE 120 may detect the best W1 basis and W2 precoding matrix, and feedback this information to the base station 110, as illustrated. At step 5 (e.g., corresponding to block 910 of FIG. 9 and block 1010 of FIG. 10), the base station 110 transmits pre-scheduled CSI-RS based on the UE feedback at step 4. For example, the base station 110 may transmit the pre-scheduled CSI-RS using the set of beams (e.g., W1 basis) selected at step 4. At step 6 (e.g., corresponding to block 912 of FIG. 9 and 1012 of FIG. 10), the UE 120 provides feedback to the base station 110 indicating channel measurement feedback information. For example, the UE 120 may feedback possible MU CQI and a corresponding MU precoder to be used for data transmission. At step 7 (e.g., corresponding to block 914 of FIG. 9 and block 1014 of FIG. 10), the base station 110 may communicate data with UE using the information obtained at step 6.

Figure 12:
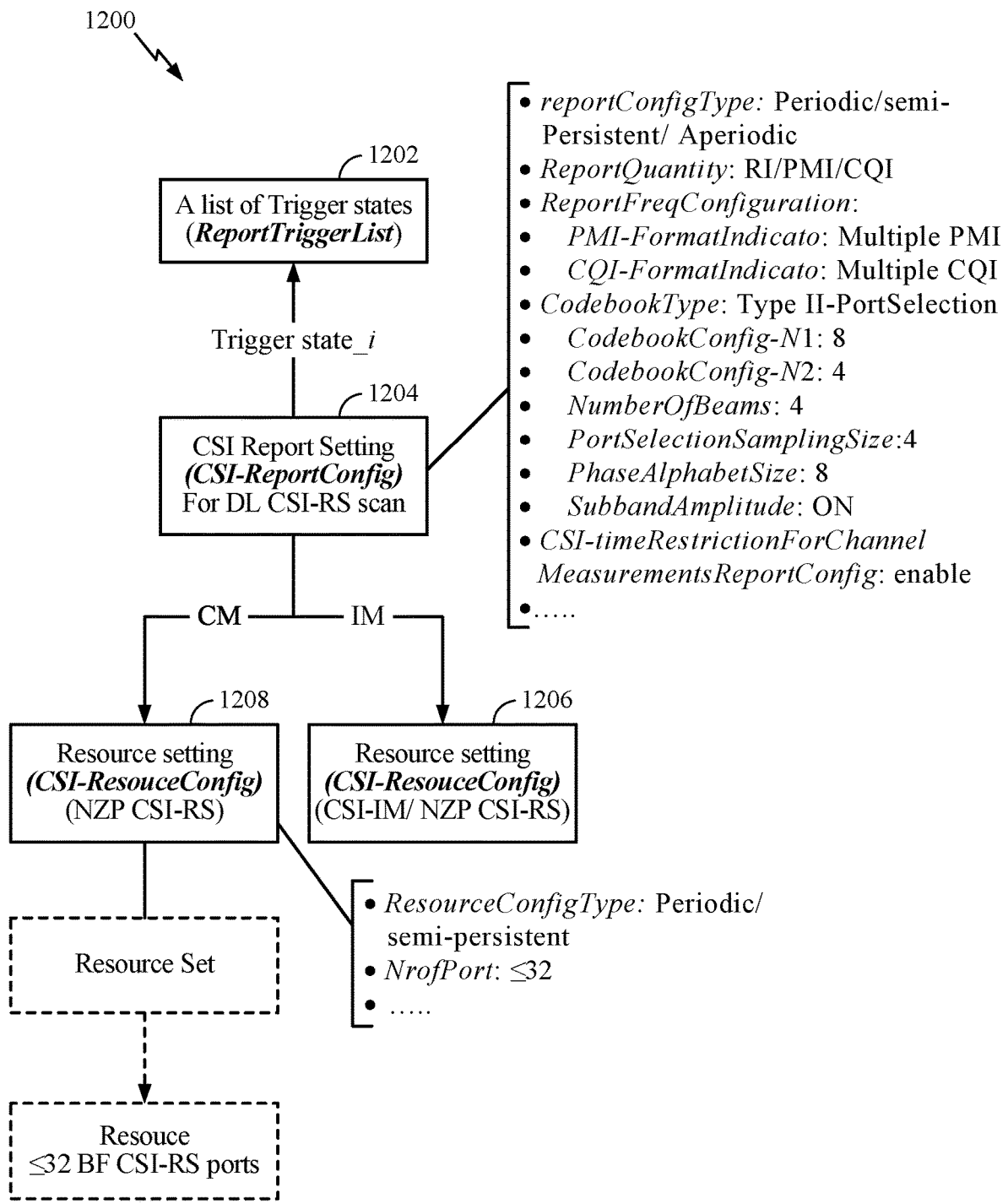
FIG. 12 illustrates example operations for selection of resource setting with up to 32 CSI-RS ports, in accordance with certain aspects of the present disclosure.

FIG. 12 illustrates example operations 1200 for selection of resource setting with up to 32 CSI-RS ports, in accordance with certain aspects of the present disclosure. For example, at block 1202, the base station 110 may determine a CSI report setting for a downlink CSI-RS scan, which may be triggered using a list of trigger states at block 1204. For example, the base station 110 may determine the reporting configuration type, report quantity, report frequency configuration, codebook type, etc., as illustrated.

At block 1206, the base station 110 may determine resource setting for IM, or at block 1208, the base station 110 may determine the resource setting for CM, such as the resource configuration type (e.g., periodic or semi-persistent) and a number of ports (NrofPort). In certain aspects, NrofPort may be equal to or less than 32. In other words, beamformed CSI-RS may be used for cell edge UEs using periodic/semi-persistent CSI-RS, and up to 32 beamformed CSI-RS ports may be used for the transmission of CSI-RSs at step 3 described with respect to FIG. 11.

As described herein, the 2D DFT beams may be selected, at step 2 of FIG. 11, for orthogonal CSI-RS ports based on SRS signals from cell edge UEs. Consequently, a codebook for beamformed NR Type II CSI may be employed for cell edge UEs to report a corresponding PMI. The UE measures the beamformed CSI-RS beams and provides feedback to the base station 110. The base station 110 then transmits pre-scheduled CSI-RS with the precoder which is derived based on UE feedback of W1 and W2 precoding matrices.

In certain aspects, a maximum of four sets of orthogonal beams, each set having a total of eight beamformed CSI-RS ports and four orthogonal CSI-RS ports in each of two polarizations, may be supported. However, the accuracy of the W1 and W2 precoding matrices may depend on the selection of orthogonal beams. Moreover, the accuracy of the selection of the orthogonal beams for the CSI-RS ports may have an impact on performance. A maximum of four sets of orthogonal beams may also limit the UE's measurement accuracy since the orthogonal beams selection depends on the SRS channel measurement quality. Thus, in certain aspects of the present disclosure, the maximum number of ports in resource setting may be enhanced from 32 to 64, as illustrated in FIG. 13.

Figure 13:
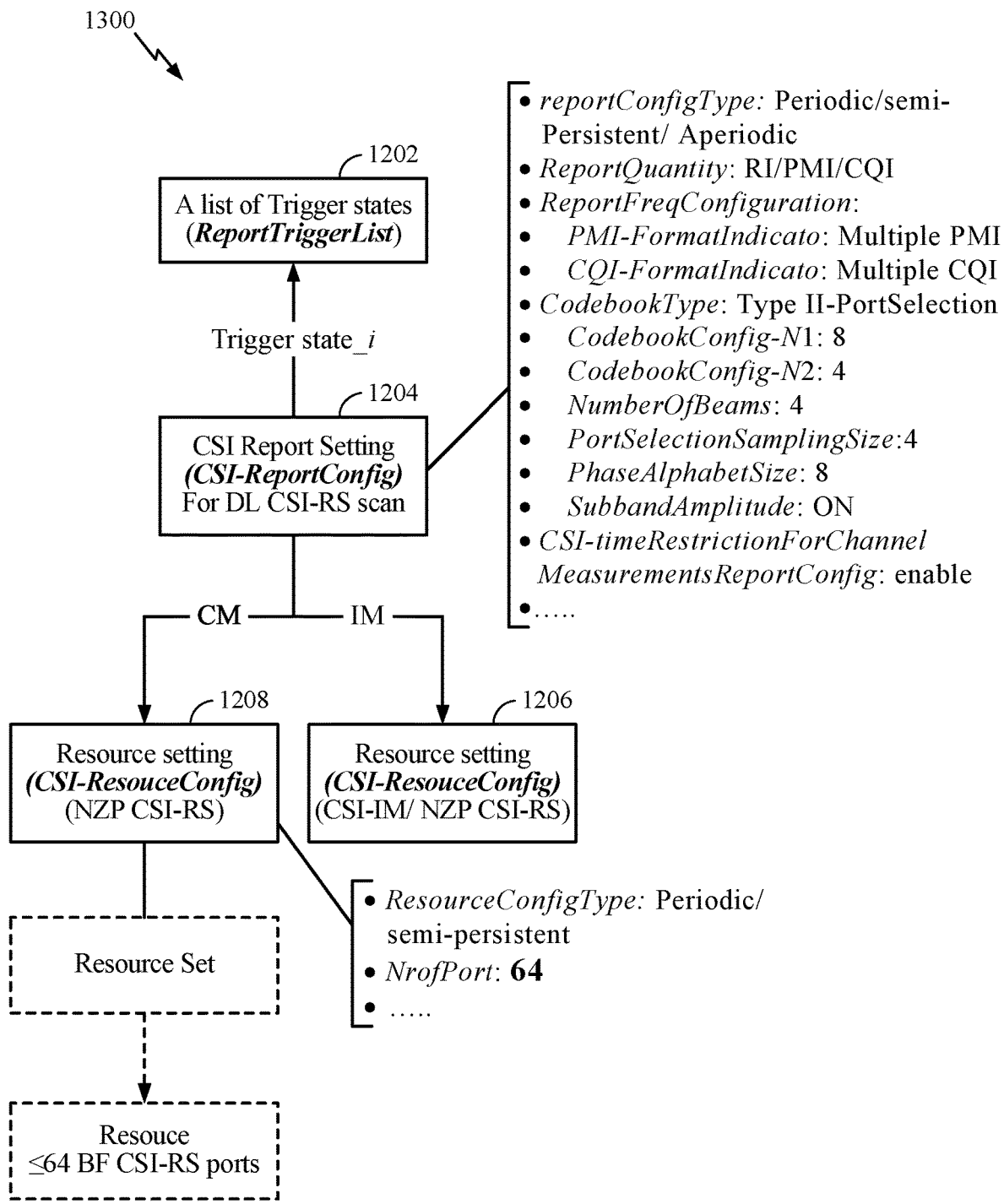
FIG. 13 illustrates example operations for resource setting selection with up to 64 CSI-RS ports, in accordance with certain aspects of the present disclosure.

FIG. 13 illustrates example operations 1300 for resource setting selection with up to 64 CSI-RS ports, in accordance with certain aspects of the present disclosure. In other words, 64 beamformed CSI-RS ports may be used, instead of 32 as described with respect to FIG. 12. In certain aspects, the W1 port selection codebook may support selecting four (e.g., corresponding to the four beams of each W1 basis illustrated in FIG. 11) among the 64 ports by enhancing X=64 and d=4, as described in more detail herein. A maximum of eight sets of orthogonal beams, each set having a total of eight beamformed CSI-RS ports, and four orthogonal CSI-RS ports in each of two polarization, may be supported. For example, in certain aspects, the W1 precoding matrix may be defined as follows:

$$W_1 = \begin{bmatrix} E_{\frac{X}{2} \times L} & 0 \\ 0 & E_{\frac{X}{2} \times L} \end{bmatrix}$$

where X is the number of CSI-RS ports. The value of L may be configurable such that $L \in \{2, 3, 4\}$. In other words, L may selected from the values 2, 3, and 4. The possible values of X may be a value up to 64. For example, $$E_{\frac{X}{2} \times L}$$

may be represented by the equation:

$$E_{\frac{X}{2} \times L} = \begin{bmatrix} e^{\left(\frac{X}{2}\right)}_{mod\left(md, \frac{X}{2}\right)} & e^{\left(\frac{X}{2}\right)}_{mod\left(md+1, \frac{X}{2}\right)} & \cdots & e^{\left(\frac{X}{2}\right)}_{mod\left(md+L-1, \frac{X}{2}\right)} \end{bmatrix},$$

where $$e_i^{\left(\frac{X}{2}\right)}$$

is a length $$\frac{X}{2}$$

vector with the i-th element equal to 1, and 0 elsewhere. For port selection, $$m \in \left\{0, 1, \ldots, \left\lceil \frac{X}{2d} \right\rceil - 1\right\}.$$

The calculation and reporting of m may be wideband $$\left(\left\lceil \log_2\left(\frac{X}{2d}\right) \right\rceil \text{ bits}\right).$$

The value of d may be configurable such that $d \in \{1,2,3,4\}$ under the condition that $$d \leq \frac{X}{2}$$

and d≤L.

In some cases, only a single resource may be configured in one resource set when NR Type II CSI-RS is configured. In certain aspects of the present disclosure, for periodic/semi-persistent and aperiodic Type II CSI-RS report setting, a maximum of eight resources may be configured in one resource set, as described in more detail with respect to FIG. 14.

Figure 14:
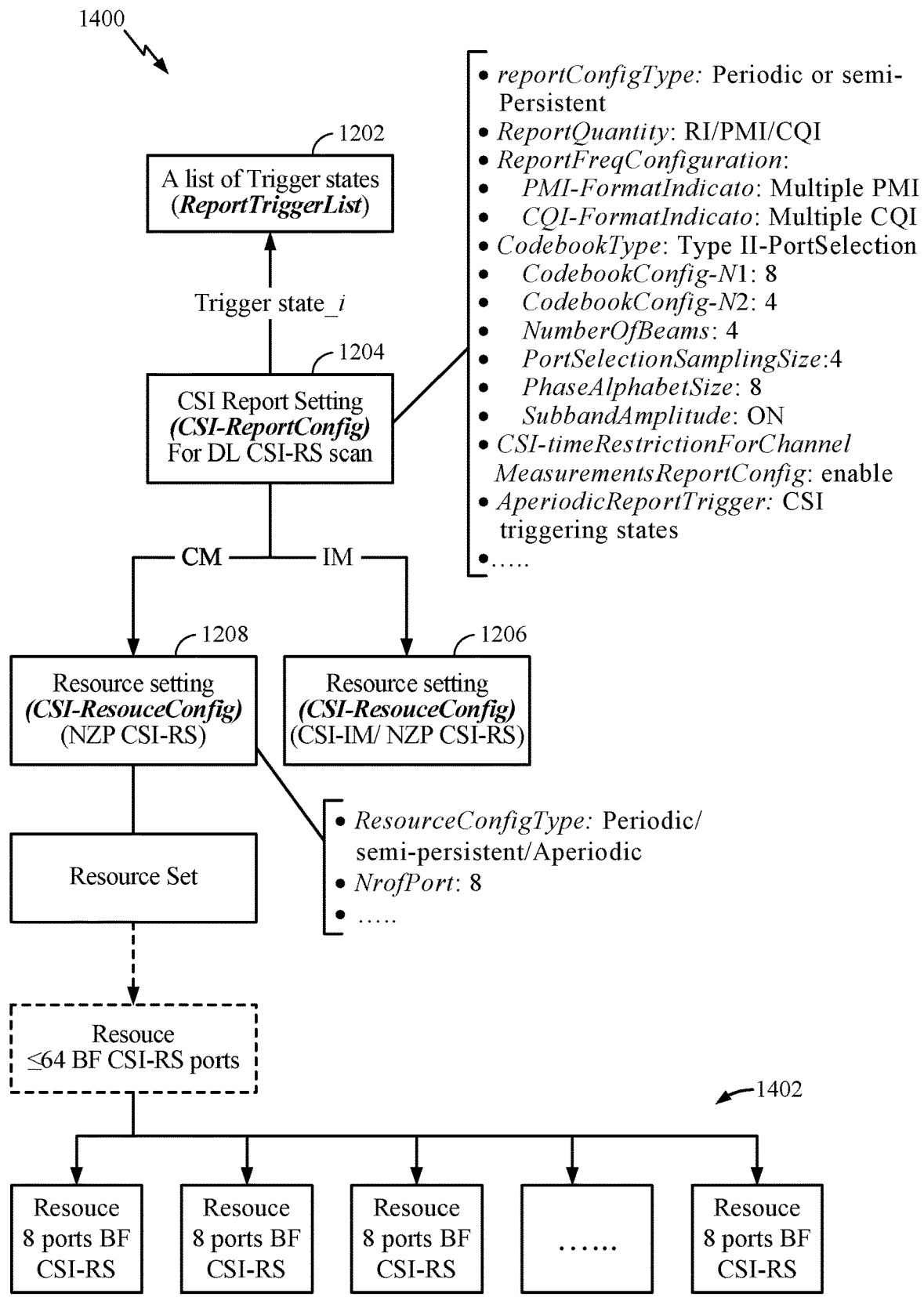
FIG. 14 illustrates example operations for selecting a resource setting having up to eight resources in one resource set, in accordance with certain aspects of the present disclosure.

FIG. 14 illustrates example operations 1400 for selecting a resource setting having up to eight resources in one resource set, in accordance with certain aspects of the present disclosure. The resources, illustrated at blocks 1402, may correspond to the multiple sets of beams (W1 basis_1 to W1 basis n) described with respect to steps 2 and 3 of FIG. 11. For example, for periodic/semi-persistent and aperiodic CSI-RS report setting (e.g., type II CSI-RS report setting), a maximum of eight resources may be configured in one resource set, each of which may include four orthogonal CSI-RS ports on each polarization (e.g., total of eight ports with two polarizations). In certain aspects, the UE may only feedback the best wideband CSI-RS resource indicator (CRI) (e.g., index corresponding to one of the multiple sets of beams selected at step 2 of FIG. 11) and the corresponding W2 precoding matrix. The W1 precoding matrix may be an identity matrix and may not be reported by the UE, in this case, since the CRI feedback from the UE (e.g., at step 4 of FIG. 11) already identifies the W1 basis. In certain aspects, the UE may only feedback the best CSI-RS resource indicator (CRI) per subband and a corresponding W2 precoding matrix. In other words, the feedback from the UE may include multiple subband CRIs indicating one of the resources (e.g., up to eight resources at blocks 1402) received with the best quality for each subband at the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RANI, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
receiving sounding reference signals (SRSs) from a user-equipment (UE);
selecting multiple sets of beams based on the SRSs received from the UE;
transmitting first channel state information-reference signals (CSI-RSs) to the UE via the multiple sets of beams;
receiving first channel measurement feedback information from the UE indicating a set of beams of the multiple sets of beams received at the UE with a best quality;
transmitting a second CSI-RS based on the first channel measurement feedback information from the UE;
receiving second channel measurement feedback information from the UE based on the second CSI-RS; and
communicating data with the UE based on the second channel measurement feedback information.

2. The method of claim 1, wherein the first CSI-RSs are transmitted using up to 64 CSI-RS ports.

3. The method of claim 1, wherein each of the multiple sets of beams comprises up to eight beams.

4. The method of claim 1, wherein the first CSI-RSs are transmitted via a resource set having a plurality of resources, each of the plurality of resources corresponding to one set of the multiple sets of beams.

5. The method of claim 4, wherein the first channel measurement feedback information from the UE comprises a wideband CSI-RS resource indicator (CRI) indicating one of the plurality of resources received with the best quality at the UE.

6. The method of claim 4, wherein the first channel measurement feedback information from the UE comprises multiple subband CRIs indicating one of the plurality of resources received with the best quality for each subband at the UE.

7. A method for wireless communication by a user-equipment (UE), comprising:
transmitting sounding reference signals (SRSs) to a base station;
receiving first channel state information-reference signals (CSI-RSs) from the base station via multiple sets of beams;
selecting a set of beams of the multiple sets of beams corresponding to one of the first CSI-RSs received at the UE with a best quality;
transmitting first channel measurement feedback information indicating the set of beams of the multiple sets of beams;
receiving a second CSI-RS from the base station based on the first channel measurement feedback information;
transmitting second channel measurement feedback information based on the second CSI-RS; and
communicating data based on the second channel measurement feedback information.

8. The method of claim 7, wherein the first CSI-RSs are transmitted using up to 64 CSI-RS ports by the base station.

9. The method of claim 7, wherein each of the multiple sets of beams comprises four beams.

10. The method of claim 7, wherein the first CSI-RSs are transmitted by the base station via a resource set having a plurality of resources, each of the plurality of resources corresponding to one set of the multiple sets of beams.

11. The method of claim 10, wherein the plurality of resources comprises up to eight resources.

12. The method of claim 10, wherein the first channel measurement feedback information comprises a wideband CSI-RS resource indicator (CRI) indicating one of the plurality of resources received with the best quality at the UE.

13. The method of claim 10, wherein the first channel measurement feedback information comprises multiple subband CRIs indicating one of the plurality of resources received with the best quality for each subband at the UE.

14. The method of claim 10, wherein each of the plurality of resources comprises four orthogonal CSI-RS ports for each of two polarizations.

15. A network node for wireless communication, the network node comprising:
a memory storing instructions; and
at least one processor coupled to the memory, the at least one processor configured to cause the network node to:

receive sounding reference signals (SRSs) from a user-equipment (UE);
select multiple sets of beams based on the SRSs received from the UE;
transmit first channel state information-reference signals (CSI-RSs) to the UE via the multiple sets of beams;
receive first channel measurement feedback information from the UE indicating a set of beams of the multiple sets of beams received at the UE with a best quality;
transmit a second CSI-RS based on the first channel measurement feedback information from the UE;
receive second channel measurement feedback information from the UE based on the second CSI-RS; and
communicate data with the UE based on the second channel measurement feedback information.

16. The network node of claim 15, wherein the first CSI-RSs are transmitted using up to 64 CSI-RS ports.

17. The network node of claim 15, wherein each of the multiple sets of beams comprises up to eight beams.

18. The network node of claim 15, wherein the first CSI-RSs are transmitted via a resource set having a plurality of resources, each of the plurality of resources corresponding to one set of the multiple sets of beams.

19. The network node of claim 18, wherein the first channel measurement feedback information from the UE comprises a wideband CSI-RS resource indicator (CRI) indicating one of the plurality of resources received with the best quality at the UE.

20. The network node of claim 18, wherein the first channel measurement feedback information from the UE comprises multiple subband CRIs indicating one of the plurality of resources received with the best quality for each subband at the UE.

21. A user-equipment (UE), the UE comprising:
a memory storing instructions; and
at least one processor coupled to the memory, the at least one processor configured to cause the UE to:
transmit sounding reference signals (SRSs) to a base station;
receive first channel state information-reference signals (CSI-RSs) from the base station via multiple sets of beams;
select a set of beams of the multiple sets of beams corresponding to one of the first CSI-RSs received at the UE with a best quality;
transmit first channel measurement feedback information indicating the set of beams of the multiple sets of beams;
receive a second CSI-RS from the base station based on the first channel measurement feedback information;
transmit second channel measurement feedback information based on the second CSI-RS; and
communicate data based on the second channel measurement feedback information.

22. The UE of claim 21, wherein the first CSI-RSs are transmitted using up to 64 CSI-RS ports by the base station.

23. The UE of claim 21, wherein each of the multiple sets of beams comprises four beams.

24. The UE of claim 21, wherein the first CSI-RSs are transmitted by the base station via a resource set having a plurality of resources, each of the plurality of resources corresponding to one set of the multiple sets of beams.

25. The UE of claim 24, wherein the plurality of resources comprises up to eight resources.

26. The UE of claim 24, wherein the first channel measurement feedback information comprises a wideband CSI-RS resource indicator (CRI) indicating one of the plurality of resources received with the best quality at the UE.

27. The UE of claim 24, wherein the first channel measurement feedback information comprises multiple subband CRIs indicating one of the plurality of resources received with the best quality for each subband at the UE.

28. The UE of claim 24, wherein each of the plurality of resources comprises four orthogonal CSI-RS ports for each of two polarizations.

* * * * *